3,084,092
SIZED PAPER MANUFACTURE
Herbert G. Arlt, Jr., Pearl River, N.Y., assignor to American Cyanamid Company, New York, N.Y., a corporation of Maine
No Drawing. Filed June 16, 1959, Ser. No. 820,614
4 Claims. (Cl. 162—158)

The present invention relates to sized paper. More particularly the invention relates to paper manufactured by conjoint use of an amino resin and a hydrophobic organic isocyanate, and to processes for the manufacture of such paper.

The manufacture of paper having high resistance to penetration by aqueous lactic acid is an important specialty of the papermaking art. Such paper is used for the wrapping of butter, margarine and cheese, and as containers for milk and buttermilk. Customarily the lactic acid resistance of such paper is determined by the penescope method wherein the paper or paperboard is first painted with methyl orange on one side and, after the methyl orange has dried, the lactic acid resistance is taken as the time required for the lactic acid solution to penetrate the board and produce five red spots. A 20% solution of lactic acid in water is used and the application temperature is 100° F. When tested in this manner first quality rosin sized paper yields values of 300–400 seconds.

The discovery has now been made that paper, paperboard, and similar cellulose webs (herein for brevity termed "paper") possess high lactic acid resistance when sized with the reaction product of a hydrophobic organic isocyanate and an amino resin. In paper of the present invention the reacted isocyanate-amino resin entity is in adsorbed state on the fibers.

Evidently this entity possesses very good hydrophobic properties, and in preferred instances the paper has yielded lactic acid resistance values in excess of 2,000 seconds. In addition, it has been found to possess very satisfactory resistance to penetration by water. The paper is thus suitable for general use in addition to the packaging of dairy products.

The paper of the present invention is made by a process which comprises forming an aqueous suspension of papermaking fibers, adsorbing an amino resin on said fibers as anchor agent for the isocyanate to be added, adding an aqueous emulsion of a hydrophobic organic isocyanate as sizing agent, and forming the suspension into paper. The latter step is performed in conventional way by sheeting the fibers and heating the resulting web at 190°–260° F. The isocyanate reacts with adsorbed resin and develops sizing properties in 1 to 3 minutes in this temperature range. This corresponds to the time and temperature employed for drying in typical papermaking machines, so that the paper is dried and the sizing properties of the isocyanate are simultaneously substantially developed therewith.

The invention does not depend upon the particular steps which are employed to adsorb the amino resin on the fibers. Thus the amino resin may be incorporated in the isocyanate emulsion, so that the resin and the isocyanate particles are adsorbed on the fibers together, the amino resin evidently being adsorbed first. This method is convenient, as it simplifies delivery of the materials to the papermaking system. For this method both cationic and anionic amino resins are useful, the former yielding cationic emulsions which are self-substantive to the fibers and the latter yielding anionic emulsions which are generally best used with alum as the depositing agent.

Alternatively, the amino resin and the isocyanate may be applied to the fibers separately. According to one embodiment of this method a cationic amino resin is added preferably first and the hydrophobic isocyanate emulsion is added subsequently. If desired, the order of addition may be reversed. This method is particularly conveniently used by paper mills which have already installed facilities for adding amino resin to the slush stock. According to another embodiment, an anionic amino resin is precipitated on the fibers first with alum, and an anionic isocyanate emulsion is subsequently added.

The principal object of the foregoing steps is to produce cellulose fibers having an amino resin and a hydrophobic organic isocyanate uniformly adsorbed thereon. The drying of the paper sheet and reaction of the isocyanate with the adsorbed amino resin take place as described above.

The amino resins employed in the process of the present invention are polymers which contain a substantial number of amino —NH— groups. At least one such group should be present for about every 10 carbon atoms of the polymer, and a larger proportion, i.e., one amino group for every five carbon atoms is preferred. In every instance sufficient amino groups should be present to render the resin in its normal state (i.e., before application) hydrophilic. The amino groupings in amide substituents are suitable for the present invention.

Amino groups containing polymers useful for the present invention include polyfunctional halohydrin resins of Daniel et al. U.S. Patent No. 2,595,935, granted on May 6, 1952; the dicyandiamide-formaldehyde-amine polymers of Dudley et al. U.S. Patent No. 2,596,014, granted on May 6, 1952; the urea-mono-substituted urea resins of Schiller et al. U.S. Patent No. 2,698,787, granted on January 4, 1955; and the polyamine-polyamide linear polymers of House et al. U.S. Patent No. 2,729,560, granted on January 3, 1956. The foregoing polymers are cationic and are substantively adsorbed by cellulose fibers. Suitable anionic amino resins include the polymers formed by copolymerizing acrylamide and acrylic acid in 9:1 molar ratio; the sulfonated dimethylolurea resins of U.S. Patent No. 2,582,840, and the aminosulfuric acid-melamine-formaldehyde resins of U.S. Patent No. 2,688,607. These resins are applied to the fibers by the use of alum.

The amount of amino resin added is small. The amino resins referred to above and in the examples are strengthening agents for paper and the amount used is generally only a fraction of the amount needed to develop maximum tensile strength. The optimum amount of amino resin to be applied as anchoring agent in each instance is generally best determined by laboratory trial, as shown in the examples.

As a rule of thumb, however, in most instances we have found that ¼% of the amino resin, based on the dry weight of the fibers, is not too much so that evidently a smaller amount of resin will act as anchor agent. At the other extreme, ½% to 1% of the resin generally appears to be too much, and paper containing amino resin in this range, even though made with an otherwise sufficient amount of isocyanate sizing agent, exhibits comparatively low sizing values.

The sizing agents used are the hydrophobic organic isocyanates, i.e., the isocyanates or isothiocyanates which are insoluble in water and which consequently can be emulsified therewith. Better results are obtained when the hydrocarbon chains of the isocyanates contain more than 12 carbon atoms rather than fewer. The invention includes the manufacture of paper by use of 6-ethyldecyl isocyanate, 6-phenyldecyl isocyanate, 6-cyclohexyldodecyl isocyanate, octadecyl isocyanate, and polyisocyanates such as 1,18-octadecyl diisocyanate and 1,12-dodecyl diisocyanate, wherein one long chain alkyl grouping serves two isocyanate radicals and imparts hydrophobic properties to the molecule as a whole. The sizing agent is added in amount between 0.05% and 5% of the dry weight of the cellulose fibers.

The process of the present invention comprises as its first step the preparation of a dilute aqueous suspension of cellulose papermaking fibers at any convenient consistency, preferably in the range 0.5%–5% by weight. To this is added the amino resin solution and the emulsified polymer either separately as a cationic, anionic or non-ionic emulsion, or together, in which event the emulsion is necessarily cationic.

Supplementary materials such as are commonly employed in papermaking may be added before sheeting. Such materials include fillers, dyes, pigments, perfumes, and germicides.

The pulp is then sheeted in customary manner to form a waterlaid web which is then heated in customary manner on steam heated rolls at a temperature between about 190° and 260° F. until dry. It is a feature of the invention that the isocyanate on the fibers develops its water-resistant properties during the normal drying operation so that the invention does not require any change in normal paper mill drying schedules.

Evidently during the heating the deposited colloidal hydrophobic organic sizing agent flows along the fibers, thereby coming into contact with the adsorbed amino resin and reacting therewith. The invention includes the manufacture of paper by use of less than sufficient amino resin to react with all the applied isocyanate and consequently includes the manufacture of paper where a part of the isocyanate reacts directly with the cellulose.

The isocyanates of the class described are liquids or low melting solids and are thus readily emulsified. A suitable procedure comprises slowly pouring the isocyanate (with or without solvent, heating, etc.) into a rapidly agitated volume of water containing a dispersing agent followed by homogenizing the resulting emulsion so as to form an emulsion having sufficient storage stability. The invention does not depend upon the particular emulsification method selected and other methods may be employed.

The invention will be described more particularly by the examples which follow. These examples represent specific embodiments of the invention and are not to be construed as limitations thereon.

*Example 1*

The following illustrates the preparation of paper of the present invention by the method wherein a cationic amino resin is first added to the fiber suspension and an anionic higher isocyanate emulsion is added separately thereafter.

The cationic amino resin is prepared by dissolving spray-dried trimethylolmelamine powder to a 12% by volume solution in water containing 0.8 mol of HCl per mol of melamine and aging the resulting solution for 16 hours at room temperature to form the acid colloid, as shown in U.S. Patent No. 2,345,543.

The isocyanate emulsion is prepared by heating a mixture of 10 gm. of octadecyl isocyanate (OI), 0.2 gm. of sodium diisopropyl naphthalene sulfonate as dispersing agent, and 150 ml. of water to 50° C., forming an initial emulsion by use of a Hamilton Beach mixer, and passing the resulting emulsion several times through a laboratory homogenizer. A milky white emulsion is obtained which does not cream or separate on standing.

Paper is prepared according to the present invention using a bleached 100% hardwood kraft pulp beaten to a Green freeness of 500 ml. and adjusted to a consistency of 0.6%. To aliquots of this pulp are added portions of the melamine-formaldehyde acid colloid (MFC) solution in amount set forth in the table below, and the aliquots are gently stirred for five minutes. Substantially all of the melamine colloid is adsorbed by the fibers in that time.

The pH of the aliquots is then adjusted to 4.5 after which the isocyanate size emulsion is added in amounts shown in the table below. The size is rapidly adsorbed by the fibers leaving a clear white water.

The pulp samples are then made into paper on a Nash handsheet machine by standard laboratory procedure at basis weight of about 50 lbs. and 200 lbs. per 25″ x 40″/500 ream. The sheets were pressed between blotters and dried on a rotary drum drier at 250° F. for one minute in the case of the light sheets and 3 minutes in the case of the heavy sheets, after which the sheets were conditioned at 73° C. and 50% relative humidity for 24 hours and tested for their water absorption and resistance to penetration by ink and hot lactic acid. The water adsorption test was performed by subjecting the sheets to total immersion at room temperature for 15 minutes. The ink resistance was determined by noting the time required for a drop of ink to pass through the paper as a visible stain and the lactic acid resistance was determined by penescope using 20% aqueous lactic acid at 100° F. The water absorption and lactic acid tests were made on the heavy sheets, and the ink tests were made on the light sheets.

Results are shown in the table in comparison with the results obtained by sheeting a portion of untreated pulp, a portion of the pulp treated with only the melamine resin and a portion of the pulp treated with only the isocyanate as controls.

| Run No. | Percent MFC Added [1] | Percent OI Added [2] | H₂O Adsorb., Percent | Ink, Sec. | Lactic Acid, Sec. |
|---|---|---|---|---|---|
| Control | | | 121.0 | 0 | 0 |
| Control | 0.7 | | 97.6 | 0 | 0 |
| Control | | 0.5 | 34.2 | 1,170 | >1,000 |
| 1 | 0.2 | 0.35 | 32.8 | 1,770 | >1,000 |
| 2 | 0.2 | 0.50 | 31.9 | 2,120 | >1,000 |
| 3 | 0.2 | 0.70 | 33.0 | 2,250 | >1,000 |

[1] Polymer solids calculated as trimethylolmelamine on dry weight of fibers.
[2] Octadecyl isocyanate on dry weight of fibers.

*Example 2*

The following illustrate the process of the present invention wherein other cationic polymers are used as anchoring agents.

The general procedure of Example 1 was followed.
The cationic resins were prepared as follows:

No. 1: Methylol-carbamyl-polyazaalkane (MCP) resin. This resin was prepared by refluxing 131.2 g. of 3,3'-iminobispropylamine with 87.5 g. of 1,2-dichloroethane and 50 cc. of water for two hours to form a polyazaalkane of maximum practical chain length. 200 cc. of water was added. 156 g. of the resulting resinous syrup was neutralized with 37% hydrochloric acid and reacted with 84 g. of potassium cyanate at 75° C. to introduce carbamyl groups. To this condensate was added 162 g. of 37% aqueous formaldehyde and the mixture reacted for 15 minutes at 68° C. at which point it was hydrophilic and well short of the hydrophobic stage.

No. 2: Urea-formaldehyde-triethylenetetramine cationic resin. This resin was prepared according to the method of Example 1 of U.S. Patent No. 2,554,475.

No. 3: Polyethylenimine (PEI), prepared by homopolymerizing ethylenimine to high molecular weight and sold under the name "Polymin P." A suitable material may be prepared by carefully heating monomeric ethylenimine, propylenimine, or butylenimine, or mixtures thereof in the presence of a catalyst, until polymerization has proceeded sufficiently far to form a resin which is hydrophilic and cationic but insufficiently far to increase the viscosity of the polyamine beyond the limits of convenience. The end-point may readily be found by testing the polymer for these properties against paper pulp or by determining the viscosity of the polymer as the self-condensation proceeds. A suitable polymer has a viscosity of 60–120 seconds, measured by the fall time of a 3 mm. steel ball through 20 mm. of a 50% aqueous solution of the polymer at 20° C.

No. 4: Epichlorohydrin-tetraethylenepentamine polymer prepared according to the procedure of Example 3 of Daniel et al., U.S. Patent No. 2,601,597. The molecular weight of this resin was estimated from its viscosity to be in excess of 50,000.

No. 5: Acrylamide-2-vinylpyridine (AM-VP) copolymer. This polymer was prepared by homopolymerizing a mixture of 10 mols of 2-vinylpyridine and 10 mols of acrylamide using a persulfate catalyst (estimated molecular weight in excess of 50,000) and then partially quaternizing with 2 mols of methyl bromide.

Results are as follows:

| No. | Cationic Polymer | | Pulp pH [3] | Percent Oil [4] Added [2] | $H_2O$ Abs., Percent | Lactic Acid, Sec. |
|---|---|---|---|---|---|---|
| | Name [1] | Percent Added [2] | | | | |
| 1 | MCP | 0.2 | 5.0 | 0.35 | 36.0 | >2,000 |
| 2 | Urea-$CH_2O$-TETA | 0.2 | 4.5 | 0.35 | 35.9 | >2,000 |
| 3 | PEI | 0.2 | 10.0 | 0.35 | 35.7 | >2,000 |
| 4 | Epi-TEPA | 0.2 | 5.0 | 0.35 | 36.2 | >2,000 |
| 5 | AM-VP | 0.2 | 5.0 | 0.35 | 36.5 | >2,000 |

[1] See text above.
[2] Based on dry weight of fibers.
[3] On addition of octadecyl isocyanate.
[4] Octadecyl isocyanate, on dry weight of fibers.

*Example 3*

The following illustrates the results obtained with different higher alkyl isocyanate sizing agents according to the process of the present invention. The general procedure of Example 1 was followed including the emulsification method shown therein.

| Run No. | Isocyanate | | $H_2O$ Abs., Percent | Lactic Acid, Sec. |
|---|---|---|---|---|
| | Name | Percent Added | | |
| 1 | Dodecyl isocyanate | 0.2 | 39.1 | >1,500 |
| 2 | 6-ethyldodecyl isocyanate | 0.2 | 36.0 | >1,500 |
| 3 | 6-phenyldodecyl isocyanate | 0.2 | 38.2 | >1,500 |
| 4 | Octadecyl isocyanate | 0.2 | 35.0 | >1,500 |
| 5 | Octadecyl diisocyanate | 0.2 | 38.3 | 1,400 |

Best results were obtained with the long chain alkyl isocyanates containing more than 10 chain carbon atoms.

*Example 4*

The following illustrates the results obtained by use of an isocyanate emulsion containing a cationic amino resin.

The emulsion was prepared by mixing 60 gm. of toluene in 300 gm. of tall oil isocyanate, stirring at 65% to form a homogeneous solution and slowly pouring with agitation to 610 cc. of water containing 1.0 gm. of polyethylenimine as anchor agent-emulsifier. The resulting emulsion was homogenized and used at once as a beater additive by the method of Example 1. A well sized sheet was obtained.

*Example 5*

The following illustrates the manufacture of sized paper according to the present invention wherein the emulsion is formed within the beater pulp.

An emulsifiable sizing agent composition was prepared by dissolving 10 gm. of octadecyl isocyanate in 50 gm. of acetone containing 0.4 gm. of sorbitan monopalmitate as non-ionic dispersing agent.

Aliquots of beaten pulp were treated with 0.2% by weight of the melamine-formaldehyde acid colloid of U.S. Patent No. 2,559,220 after which sufficient of the isocyanate solution was slowly poured into the pulp suspension with gentle agitation to provide a uniformly distributed content of 0.5% of the isocyanate on the dry weight of the fibers. Thereafter the pulp sample was sheeted, dried and tested by the method of Example 1.

The handsheets obtained had a water absorption value of 31.0% and ink resistance and lactic acid resistance values in excess of 2,000 and 1,000 seconds, respectively.

*Example 6*

The process of the present invention is adapted to improving the sizing imparted by polymeric isocyanates and isothiocyanates. A suitable isocyanate is prepared by dissolving polyvinylamine hydrochloride in xylene in a closed reactor and pumping in phosgene gas. The reaction proceeds at room temperature and is continued until substantially all of the amino groups of the polyvinylamine are converted to the carbamyl chloride. Supply of phosgene is then discontinued, and the reaction mixture is heated to decompose the carbamyl chloride with liberation of HCl thereby forming the isocyanate. The solvent and HCl are then stripped off leaving polyvinyl isocyanate.

The polyvinyl isocyanate is emulsified in water at room temperature using an anionic emulsifying agent and homogenized. To a beater pulp treated with 0.2% by weight of melamine-formaldehyde acid colloid (polymer solids based on the dry weight of the fibers) is added the polyvinyl isocyanate emulsion with gentle stirring in amount sufficient to supply 0.6% of polymer solids based on the dry weight of the fibers.

The suspension is sheeted and the sheets dried as described above. They are well sized.

The method is generally applicable to the manufacture of paper by use of polymers containing isocyano and isothiocyano substituents.

I claim:

1. A method of manufacturing paper of high resistance to penetration by aqueous lactic acid solution, which comprises forming an aqueous suspension of papermaking fibers, adsorbing an amino resin on said fibers as anchor agent for the isocyanate to be added, adding an aqueous anionic emulsion of a hydrophobic organic isocyanate, sheeting said fibers to form a waterlaid web, and heating said web at a temperature between 190° F. and 260° F. for up to about 3 minutes thereby drying the paper and simultaneously substantially developing the sizing properties of the isocyanate thereon.

2. A method according to claim 1 wherein the solution of the cationic amino resin is added after the anionic emulsion of the hydrophobic organic isocyanate.

3. A method of manufacturing paper of high resistance to penetration by aqueous lactic acid solution, which comprises forming an aqueous suspension of papermaking fibers, adding to said suspension an emulsion of a hydrophobic organic isocyanate containing a cationic amino resin as anchor agent for said isocyanate, sheeting said fibers to form a waterlaid web, and heating said web at a temperature between 190° F. and 260° F. for up to about 3 minutes thereby drying the paper and simultaneously substantially developing the sizing properties of the isocyanate thereon.

4. A method of manufacturing paper of high resistance to penetration by aqueous lactic acid solution, which comprises forming an aqueous suspension of papermaking fibers, separately adding to said suspension a cationic emulsion of a hydrophobic organic isocyanate containing a cationic amino resin as anchor agent for said isocyanate, sheeting said fibers to form a waterlaid web, and heating said web at a temperature between 190° F. and 260° F. for up to about 3 minutes thereby drying the paper and simultaneously substantially developing the sizing properties of the isocyanate thereon.

(References on following page)

References Cited in the file of this patent

UNITED STATES PATENTS

| | | |
|---|---|---|
| 2,284,896 | Handford et al. | June 2, 1942 |
| 2,303,364 | Schirm | Dec. 1, 1942 |
| 2,374,136 | Rothrock | Apr. 17, 1945 |
| 2,563,897 | Wilson et al. | Aug. 14, 1951 |
| 2,647,884 | Systrach | Aug. 4, 1953 |
| 2,806,190 | Robinson | Sept. 10, 1957 |
| 2,835,652 | Haven | May 20, 1958 |
| 2,897,094 | Hayes et al. | July 28, 1959 |

FOREIGN PATENTS

| | | |
|---|---|---|
| 804,504 | Great Britain | Nov. 19, 1958 |

UNITED STATES PATENT OFFICE

CERTIFICATE OF CORRECTION

Patent No. 3,084,092                                      April 2, 1963

Herbert G. Arlt, Jr.

It is hereby certified that error appears in the above numbered patent requiring correction and that the said Letters Patent should read as corrected below.

Column 5, line 57, for "65%" read -- 65° C. --.

Signed and sealed this 3rd day of May 1966.

(SEAL)
Attest:

ERNEST W. SWIDER                          EDWARD J. BRENNER
Attesting Officer                            Commissioner of Patents